United States Patent
Binder et al.

(10) Patent No.: US 7,066,694 B2
(45) Date of Patent: Jun. 27, 2006

(54) CUTTING PLATE FOR A DRILL BIT

(75) Inventors: Marco Binder, Büchlberg (DE); Markus Rompel, Büchlberg (DE); Franz Stockbauer, Jr., Büchlberg (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/819,799

(22) Filed: Apr. 7, 2004

(65) Prior Publication Data

US 2005/0025595 A1   Feb. 3, 2005

(30) Foreign Application Priority Data

Apr. 10, 2003  (GB) .................................. 0308287.2

(51) Int. Cl.
*B23B 51/02*  (2006.01)
(52) U.S. Cl. ...................... 408/228; 408/713; 175/415; 175/420.1
(58) Field of Classification Search ................ 175/394, 175/395, 415, 420.1, 427; 408/227, 228, 408/233, 713
See application file for complete search history.

(56) References Cited

U.S. PATENT DOCUMENTS

| | | | | |
|---|---|---|---|---|
| 2,354,985 | A | * | 8/1944 | Davis .......................... 408/228 |
| 2,378,094 | A | | 6/1945 | Nunes-Vaz |
| 2,889,725 | A | | 6/1959 | Turton et al. |
| 3,121,351 | A | | 2/1964 | Mount |
| 4,120,601 | A | * | 10/1978 | Benjamin .................... 408/226 |
| 4,480,952 | A | | 11/1984 | Jeremias |
| 4,563,924 | A | * | 1/1986 | Runkle et al. ................ 82/1.11 |
| 4,568,227 | A | | 2/1986 | Hogg |
| 4,568,229 | A | | 2/1986 | Hulsey |
| 4,854,789 | A | * | 8/1989 | Evseanko, Jr. ............... 408/125 |
| 4,906,146 | A | | 3/1990 | Bowling |
| 4,984,944 | A | * | 1/1991 | Pennington et al. ........ 408/223 |
| 5,094,572 | A | * | 3/1992 | Alsbury et al. ............. 408/229 |
| 5,375,672 | A | * | 12/1994 | Peay et al. ................ 175/420.1 |
| 5,735,648 | A | * | 4/1998 | Kleine ......................... 408/144 |

(Continued)

FOREIGN PATENT DOCUMENTS

DE   3823409 A1 *  1/1990

(Continued)

*Primary Examiner*—Boyer D. Ashley
*Assistant Examiner*—Michael W. Talbot
(74) *Attorney, Agent, or Firm*—Harness, Dickey & Pierce, P.L.C.

(57) ABSTRACT

A cutting plate (4) has a working end (20) to engage a workpiece and an axis (8) of rotation. A pair of oppositely arranged first faces (34) are inclined axially rearward from the working end (20) in an axial plane intersecting said first faces (34). A pair of second faces (30) are alternately arranged between the first faces (34). The second faces (30) are inclined axially rearward from the working end (20) in an axial plane (37) intersecting the second faces (30), and a pair of axis parallel front faces (24). Each of the front faces (24) is bound on three sides by a respective first face (34) and the pair of second faces (30). Each second face (30) is inclined radially inward from a transitional edge with a respective rotationally leading first face (34) in a plane normal to the axis (8) intersecting the transitional edge with a respective rotationally leading first face (34). Each first face (34) is inclined radially inward from a transitional edge (36) with a respective rotationally leading second face (30) in a plane normal to the axis (8) intersecting the transitional edge (36) with a respective rotationally leading second face (30), as the cutting plate (4) rotates.

11 Claims, 6 Drawing Sheets

U.S. PATENT DOCUMENTS

| | | | |
|---|---|---|---|
| 5,779,403 A * | 7/1998 | Kleine et al. ............... 408/230 |
| 5,829,927 A | 11/1998 | Nakamura et al. |
| 5,863,162 A | 1/1999 | Karlsson et al. |
| 5,893,688 A * | 4/1999 | Wiker et al. ................ 408/230 |
| D415,774 S | 10/1999 | Wakai |
| 5,971,674 A | 10/1999 | Holley |
| 6,145,606 A * | 11/2000 | Haga ....................... 175/420.1 |
| 6,345,940 B1 * | 2/2002 | Anjanappa et al. ......... 408/230 |
| 6,371,702 B1 * | 4/2002 | DeWald et al. ............. 408/227 |
| 6,447,222 B1 | 9/2002 | Kojima |
| 6,481,938 B1 | 11/2002 | Widin |
| 6,550,555 B1 * | 4/2003 | Huber et al. ................ 175/415 |
| 2003/0138304 A1 * | 7/2003 | Haussmann et al. ........ 408/227 |

FOREIGN PATENT DOCUMENTS

WO  WO 8303563 A1 * 10/1983

* cited by examiner

CUTTING PLATE FOR A DRILL BIT

CROSS-REFERENCE TO RELATED APPLICATIONS

This application claims priority to Great Britain Patent Application No. 0308287.2 filed Apr. 10, 2003, which application is herein expressly incorporated by reference.

FIELD OF THE INVENTION

The present invention relates to a cutting plate for a drill bit and relates particularly, but not exclusively, to a cutting plate for a drill bit for rotary cutting of ceramic tiles. The invention also relates to a drill bit incorporating such a cutting plate.

BACKGROUND OF THE INVENTION

Rotary cutting of a ceramic tile presents various difficulties because of the hardness and smoothness of both the glazed protective layer of the tile and the tile substrate material itself. It is known to cut ceramic tiles by initially using a small diameter drill bit to cut a small hole in the protective layer to minimise the possibility of cracking the protective layer and the tile substrate. Next drill bits of successively larger diameters are used to enlarge the hole to the required size once the tile has been pierced with a small hole and the risk of damage to the tile is reduced. However, this known method suffers from the drawback that several drill bits of different fixed diameters are required in order to cut a hole in the tile to a desired diameter.

One known drill bit which seeks to overcome the above mentioned problem is disclosed by International patent publication no. WO 03/061927A1. This drill bit has a cutting plate seated in one end of a cylindrical shank with a rotational axis. Viewed in side elevation, the cutting plate has a rectangular main body portion seated in the shank and a triangular portion extending from the main body portion. The triangular portion is terminated by a small pyramidal portion with a small chisel edge at its foremost end. The chisel edge is defined by a pair of inclined front faces and a pair of inclined side flanks. The intersection between the pair of inclined side flanks forms the chisel edge. The inclined front faces define the length of the chisel edge. Each inclined side flank is inclined axially rearward away from the chisel edge until each meets a respective inclined side face. Each inclined side face is also inclined axially rearward away, but at a steeper angle than that of an adjacent inclined side flank. Each inclined front face is inclined axially rearward from a respective end of the chisel edge until each meets a respective axis parallel front face. In use, the hole in the ceramic tile is steadily increased from a very small diameter to the full working diameter of the drill bit, in one operation.

A primary cutting edge is formed at the intersection between the inclined side flanks and a respective rotationally leading inclined front face. A second cutting edge is formed at the intersection between the inclined side faces and a respective rotationally leading front face. The inclined side flanks and side faces are also inclined radially inward from their respective rotationally leading primary and secondary cutting edges. However, the inclined front faces are inclined radially inward from their respective rotationally trailing primary cutting edges, whilst the parallel front faces are not radially inclined, one way or the other. For the sake of clarity, a face or edge that is 'inclined radially inward' from a given point is one that departs from said point in a direction tending, or inclined, towards the axis of rotation.

Thus, a cross section through a plane normal to the rotational axis and including the primary cutting edges would reveal that the inclined side flanks and front faces circumscribe a first parallelogram shape. In this first parallelogram the primary cutting edges are located in the corners furthest apart and it is the inclined side flanks that provide relief to the primary cutting edges.

Likewise, another cross section through any plane normal to the rotational axis, including the secondary cutting edges, would reveal that the inclined side faces and front faces circumscribe a second parallelogram shape. In this second parallelogram the secondary cutting edges are located in the corners furthest apart and the inclined side faces provide relief to the secondary cutting edges.

In both parallelograms, opposing faces are parallel. In the case of the second parallelogram, the included angle at the secondary cutting edges is 90° minus the angle of inward radial inclination of the inclined side faces. This is because the parallel front faces are not radially inclined. In the case of the second parallelogram, each inclined side flank and front face is inclined radially inward from a respective intersecting primary cutting edge. Therefore, the included angle at the primary cutting edges would be 90° minus the sum of the angles of inward radial inclination of the inclined side flanks and side faces. Accordingly, the first parallelogram is more collapsed and has sharper primary cutting edges than the second parallelogram which is fuller and has duller, or less sharp, secondary cutting edges. For the sake of clarity, a more 'collapsed' parallelogram is intended to mean one that circumscribes a smaller area than a fuller, or less 'collapsed', parallelogram having equivalent sides. Of course, a rectangle circumscribes the fullest possible area of a parallelogram of a given length sides.

Whilst the sharp primary cutting edges of the drill bit disclosed by WO 03/061927 A1 have an initial advantage of cutting a ceramic tile more quickly this initial advantage is short lived and these sharp primary cutting edges soon wear and become blunt when used upon relatively hard and abrasive materials such as ceramic tiles. Such sharp cutting edges are also brittle and more prone to chipping. This is especially problematic at the foremost working end of the drill bit in the region of the chisel edge where the cutting plate's geometry is small and there is not enough spare material to re-sharpen chipped cutting edges more than a few times, if at all. This reduces the life span of the drill bit. Further, if the inclined side faces are steeply inclined axially rearward with an included angle falling within the range of 30° to 60° then the cutting plate's geometry in the region of the chisel edge becomes especially small. In this case breakage of the cutting edges could result complete removal of the foremost working end of the cutting plate making its re-sharpening impossible.

SUMMARY OF THE INVENTION

The present invention seeks to overcome these disadvantages, or at least mitigate them. A cutting plate comprises a working end to engage a workpiece and axis of rotation. A pair of oppositely arranged first faces are inclined axially rearward from the working end in an axial plane intersecting the first faces. A pair of second faces are alternately arranged between the first faces. The second faces are inclined axially rearward from the working end in an axial plane intersecting the second faces. A pair of axis parallel front faces are included on the cutting plate. Each of the front faces is bound on three sides by a respective first face and the pair of second faces. Each second face is inclined radially inward from a transitional edge with a respective rotationally leading first face in a plane normal to the axis intersecting the transitional edge with a respective rotationally leading first face. Each first face is inclined radially inward from a transitional edge with a respective rotationally leading second face in a plane normal to the axis intersecting the transitional edge with a respective rotationally leading second face, as the cutting plate rotates. The pair of second faces can be a pair of planar faces or a pair of faces comprising a plurality of individual planar surfaces.

Thus, the parallelogram circumscribed by the first and second faces can be any parallelogram shape ranging from a partially collapsed parallelogram, with sharp cutting edges, up to and including, a rectangle with four right-angled edges. The closer the parallelogram resembles a rectangle the greater the enclosed area therein and the stronger the cutting plate at its foremost working end. This makes the cutting plate more resistant to breakage caused by a chipped cutting edge. Thus the cutting edges can be orientated with respect to the workpiece in a more aggressive manner to increase speed of cutting while limiting the chance of chipping the cutting edges to an acceptable level.

Preferably a chisel edge is defined by the intersection of one of the pair of first or second faces at the foremost of the working end. The chisel edge provides an edge to penetrate the outer layer of a workpiece to begin the hole cutting process. A chisel edge at the foremost end of the cutting plate is less brittle than a single cutting point and is therefore less prone to chipping. The length of the chisel edge is defined by the other of the pair of first or second faces. If the chisel edge is chipped then it can be re-sharpened by grinding either of both of the pair of first or second faces.

Preferably, an angle, subtended by the one of the pair of first or second faces forming the chisel edge, falls within a range of 90° to 150°. Thus, the chisel edge is sharp enough to cut the outer layer of the ceramic tile without being easily chipped. More preferably, the angle subtended by the one of the pair of first or second faces forming the chisel edge is 100°.

Preferably, the transitional edge between each first face and a respective rotationally leading second face is a primary cutting edge. Also, a transitional edge between each second face and a respective rotationally leading front face is a secondary cutting edge. The primary and secondary cutting edges can be continuous, but need not be for satisfactory cutting of a workpiece. The second and first faces provide relief to the primary and secondary cutting edges, respectively.

Additionally, the cutting plate further comprises a pair of axis parallel side faces each bound on three sides by a respective second face and the pair of front faces. A side cutting edge is defined at the intersection of each side face with a respective rotationally leading front face. Each side face is inclined radially inward from a respective side cutting edge in a plane normal to the axis intersecting the side cutting edge.

Preferably, the angle, subtended by the second faces in an axial plane orthogonal to the second faces, falls within a range of 30° to 60°. More preferably, the angle subtended by the second faces in an axial plane orthogonal to the second faces is 43°. The cutting plate, when viewed from the side, has an increasingly sharp arrow head shape as the angle subtended by the first faces is decreased. A relatively sharp included angle between the second faces helps to cut a cleaner hole in a workpiece for the reasons discussed above.

Preferably, the cutting plate further comprises a mechanism for precise attachment of the cutting plate to a shank of a drill bit. Such an attachment mechanism is useful for easily and reliably attaching the cutting plate to a shank of a drill bit. Thus, the axes of rotation of the cutting plate and shank are concentric.

The cutting plate is best suited for cutting holes in ceramic material. The cutting plate is particularly well suited to cut holes in ceramic tiles.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figures 1, 2:
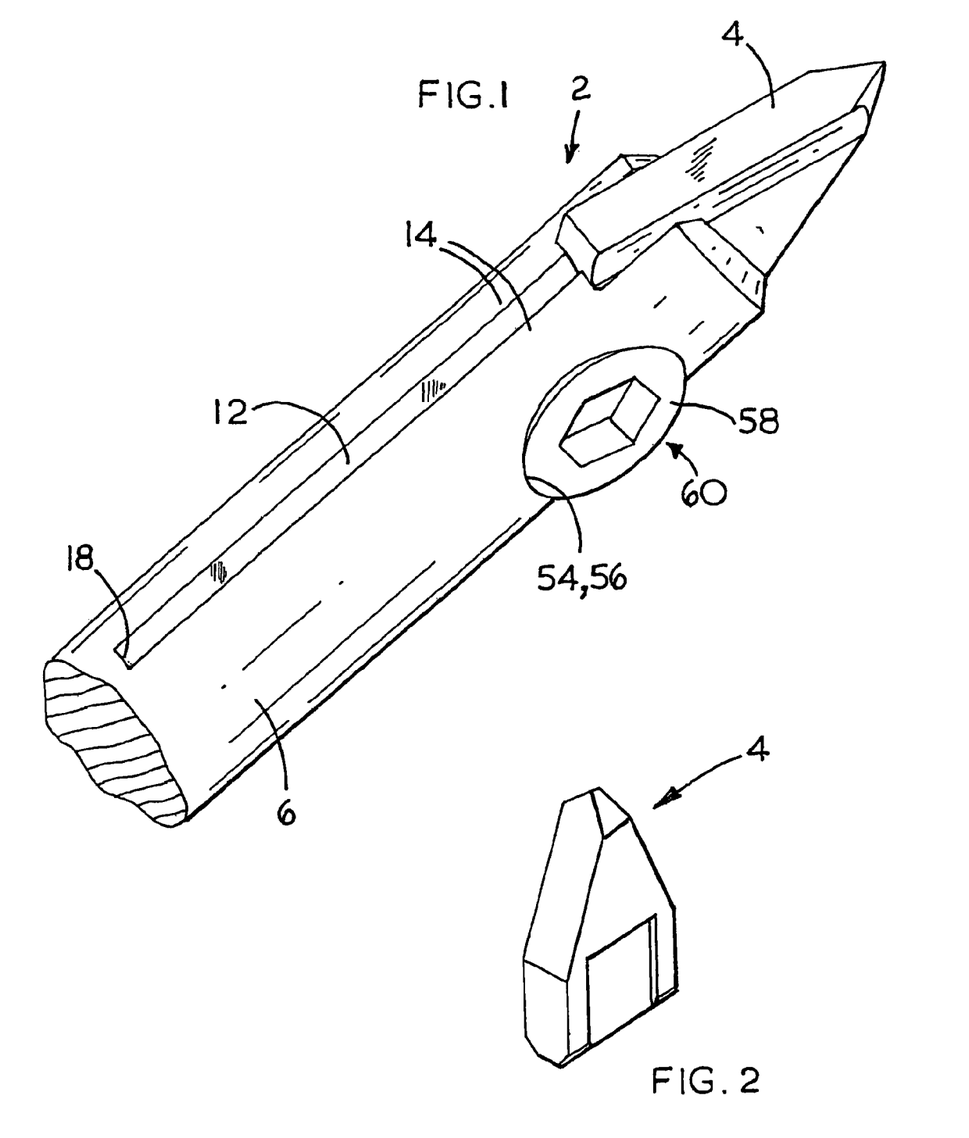
FIG. 1 is a perspective view of a drill bit in accordance with the present invention.
FIG. 2 is a perspective view of a cutting plate of the present invention.

Referring to FIG. 1, a drill bit 2 is shown for rotary cutting of ceramic material. The drill bit 2 has a cutting plate 4 and an elongate cylindrical shank 6 defining a central longitudinal axis 8 of rotation. One end of the shank 6 engages a chuck of a rotary power drill (not shown). A groove 12 is at the opposite end of the shank 6. The groove 12 seats the cutting plate 4. The groove 12 is flanked by a pair of opposing jaws 14. The cutting plate 4 is removably clamped by the jaws 14 to secure it to the shank 6. The cutting plate 4 is formed from a suitably hard material like, for example, hardened steel or tungsten carbide. In use, the drill bit 2 rotates in the direction of the circular arrow R, as is shown in FIG. 4.

Figure 3:
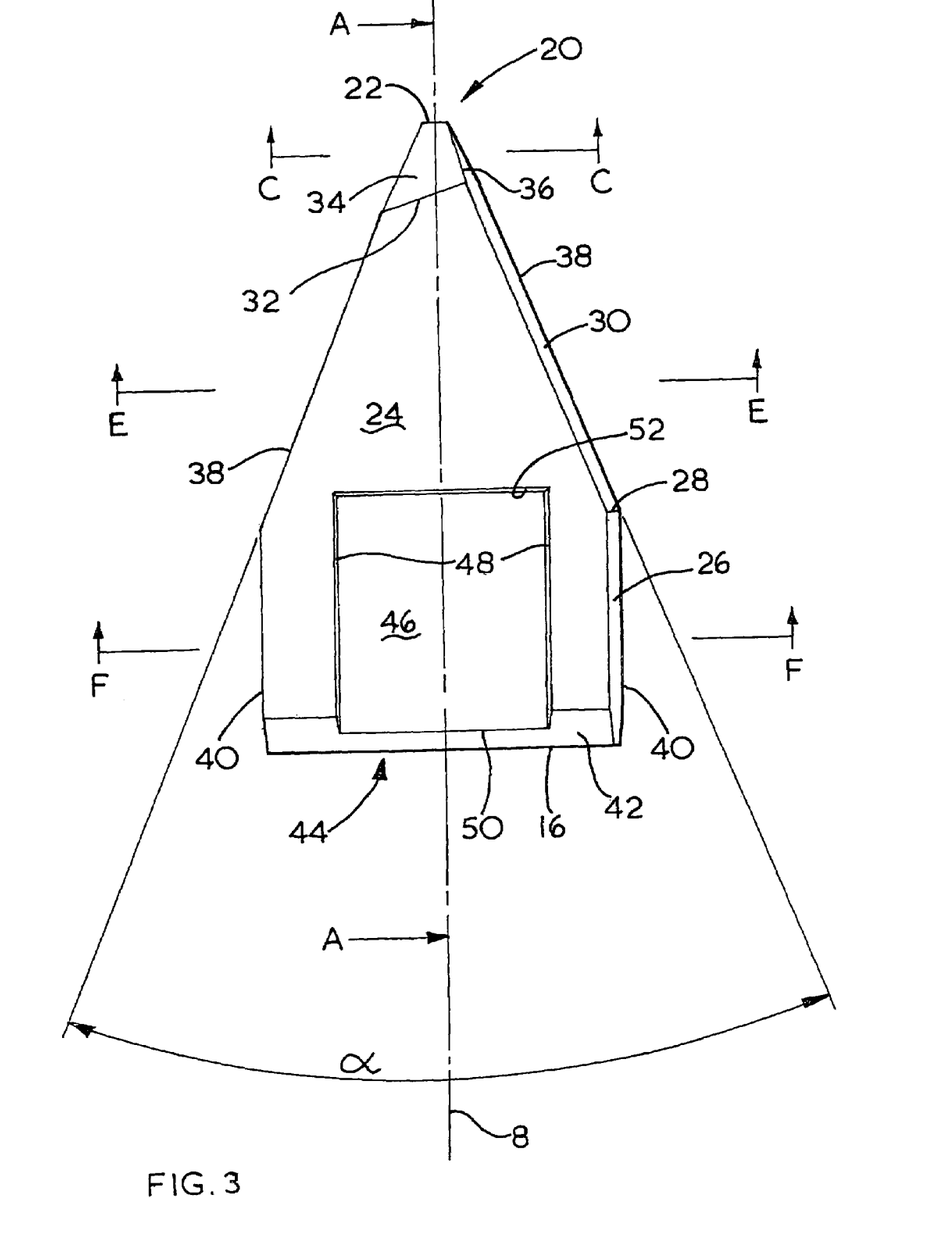
FIG. 3 is an enlarged front elevation view of the cutting plate of FIG. 2.

When viewed in front elevation, as is shown in FIG. 3, the cutting plate 4 is generally shaped as a flattened arrow-head. At one end the cutting plate 4 has a planar base 16. The base 16 faces a trough 18 of the groove 12 when the cutting plate 4 is seated in the groove 12. At the opposite end the cutting plate 4 has a sharp tip 20 to cut a workpiece. The tip 20 has a straight chisel edge 22 which forms the foremost end of the bit 2. The base 16 and the chisel edge 22 are normal to the axis 8. The central axis of the cutting plate 4 is concentric with the axis 8 of the shank 6.

Figure 4:
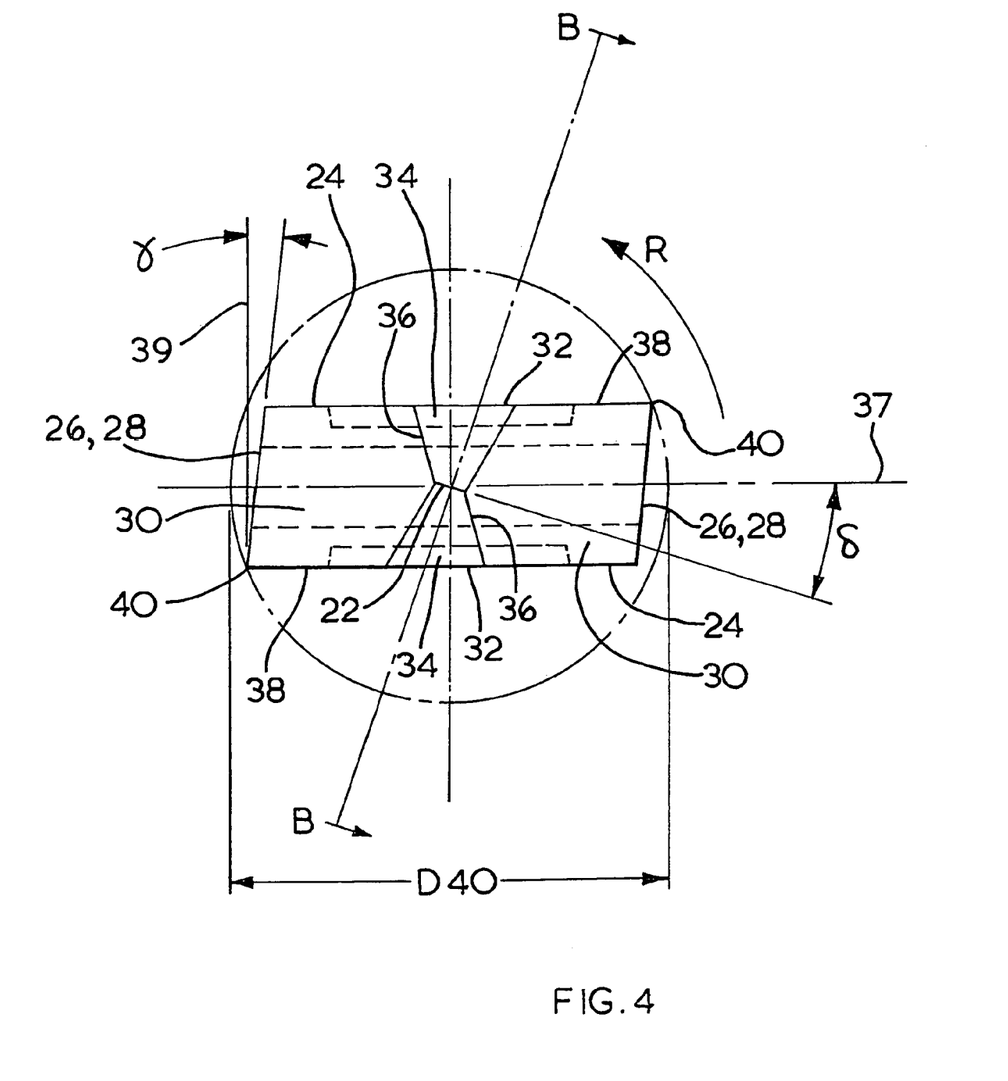
FIG. 4 is an enlarged plan view of the cutting plate of FIG. 2.

When viewed in plan, as is shown in FIG. 4, the cutting plate 4 is generally parallelogram shaped with a pair of axis parallel opposing front faces 24 and a pair of axis parallel opposing narrow side faces 26 arranged alternately between the front faces 24.

Figure 5:
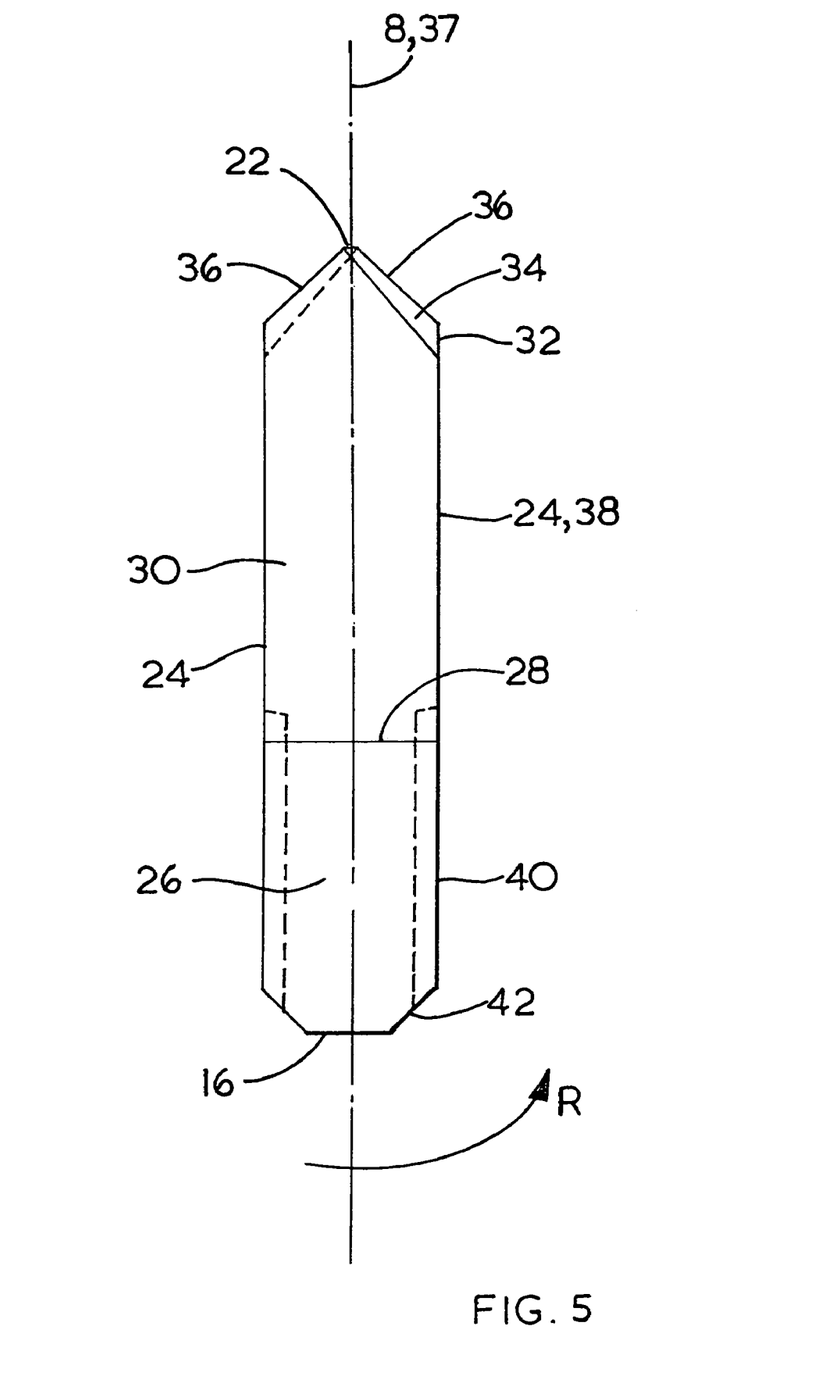
FIG. 5 is an enlarged side elevation of the cutting plate of FIG. 2.

Referring to FIGS. 3 and 5, each side face 26 extends from the base 16 towards the tip 20, to a respective straight side shoulder edge 28. Each side shoulder edge 28 forms a transition between one side face 26 and a respective narrow inclined side face 30. Like the side faces 26, the inclined side faces 30 are also arranged alternately between the front faces 24. The inclined side faces 30 are convergent such that each inclined side face 30 extends from a respective side shoulder edge 28 towards the tip 20 where they abut at each end of the chisel edge 22. The length of the chisel edge 22 is defined by the inclined side faces 30. The converging inclined side faces 30 subtend an angle $\alpha$, as measured in an axial plane orthogonal to the inclined side faces 30. The cutting plate 4 can be manufactured with an angle $\alpha$ in the range between 30° to 60°. Angle $\alpha$ is 43° in FIG. 3. The smaller angle $\alpha$, the steeper the axially rearward inclination of the inclined side faces 30. Accordingly, the smaller angle $\alpha$, the more gradual the enlargement of the diameter of the hole cut in the workpiece. This results in a cleaner hole with fewer, or no, chips around its circumference.

Figures 6, 7:
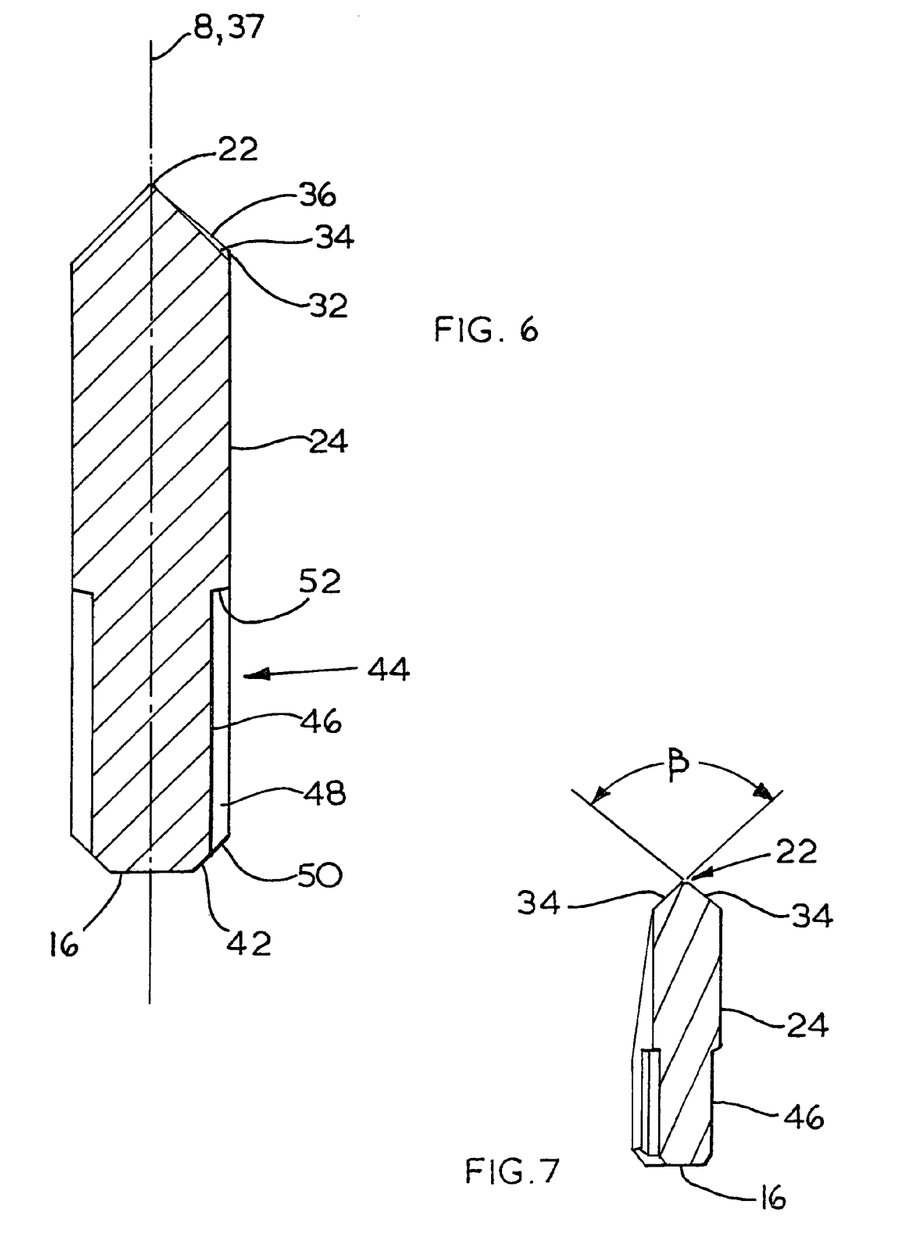
FIG. 6 is a cross-sectional view along the line A—A of FIG. 3.
FIG. 7 is a cross-sectional view along the line B—B of FIG. 4.

Referring to FIG. 3, each front face 24 extends from near the base 16 towards the tip 20 to a respective straight front shoulder edge 32. Each front shoulder edge 32 forms a transition between a front face 24 and a respective inclined front face 34. The inclined front faces 34 are convergent such that each inclined front face 34 extends from a respective front shoulder edge 32 towards the tip 20 where they intersect to form the chisel edge 22. The converging inclined front faces 34 subtend an angle $\beta$, which is measured in an axial plane perpendicular to the chisel edge 22. The inclined front faces 34 are arranged alternately between the inclined side faces 30. The cutting plate 4 can be manufactured with an angle $\beta$ in a range between 90° to 150°. An angle $\beta$ falling in the range of 100° to 110° provides a chisel edge 22. The best compromise between strength and speed of cutting is when angle $\beta$ is 100° as in FIG. 7.

As is shown in FIGS. 4 and 5, a primary cutting edge 36 is formed at the intersection between each inclined front face 34 and a respective rotationally leading inclined side face 30. Each inclined front face 34 is inclined radially inward from a respective rotationally leading primary cutting edge 36 in a plane normal to the axis 8 intersecting the primary cutting edge 36. The inclined front faces 34 create relief behind the primary cutting edges 36. An angle $\theta$ of inward radial inclination of each inclined front face 34 is measured from an axial plane 37 bisecting the front faces 24. The cutting plate can be manufactured with an angle $\theta$ in the range of 1° to 20°. Angle $\theta$ is 9° in FIG. 8. The working diameter D36 of the primary cutting edges 36 steadily increases as the cutting plate 4 penetrates the workpiece W.

A secondary cutting edge 38 is formed at the intersection between each inclined side face 30 and a respective rotationally leading front face 24. Each inclined side face 30 is inclined radially inwardly from a respective rotationally leading secondary cutting edge 38 in a plane normal to the axis 8 intersecting the secondary cutting edge 38. The inclined side faces 30 create relief behind the secondary cutting edges 38. An angle $\lambda$, of inward radial inclination of each inclined side face 30, is measured from a plane 39 orthogonal to the axial plane 37 bisecting the front faces 24. The cutting plate 4 can be manufactured with an angle $\lambda$ in the range of 30 to 15°. Angle $\lambda$ is 5° in FIGS. 8 and 9. The working diameter D38 of the secondary cutting edges 38 steadily increases as the cutting plate 4 penetrates the workpiece W.

A side cutting edge 40 is formed at the intersection between each side face 26 and a respective rotationally leading front face 24. Each side face 26 is inclined radially inwardly from a respective rotationally leading side cutting edge 40 in a plane normal to the axis 8 intersecting the side cutting edge 40. The side faces 26 create a relief behind the side cutting edges 40. An angle $\gamma$ of inward radial inclination of each side face 30 is measured from the plane 39 orthogonal to the axial plane 37 bisecting the front faces 24. The cutting plate can be manufactured with an angle $\gamma$ in the range of 3° to 15°. Angle $\gamma$ is 5° in FIG. 10. The side cutting edges 40 define the maximum working diameter D40 of the cutting plate 4.

The chisel edge 22 is approximately 5% to 20% of the working diameter D40 of the cutting plate 4. The chisel edge 22 is continuous with the primary cutting edges 36 located on either side. Each secondary cutting edge 38 is continuous with a respective side cutting edge 40. However, there exists a break between the primary cutting edges 36 and the secondary cutting edges 38. As is most clearly shown in FIG. 6, the chisel edge 22 is rotationally advanced of the trailing primary cutting edges 36. The primary cutting edges 36 are rotationally advanced of respective secondary 38 and side 40 cutting edges. The chisel edge 22 is rotationally advanced of the trailing secondary 38 and side 40 cutting edges by an angle of rotation of 180°—angle $\delta$, as is shown in FIG. 4. Angle $\delta$ is between 13° to 23° and 18° as shown in FIG. 4.

Referring to FIGS. 3 and 4, the base 16 has a pair of chamfers 42 extending between the side faces 26. Each chamfer 42 joins the base 16 with a respective front face 24. The chamfers 42 result in partial tapering of the cutting plate 4 to ease its insertion into the groove 12 of the shank 6 during assembly. The cutting plate 4 also has a shallow rectangular recess 44 in each front face 24. The recess 44 extends from near the base 16 to approximately the midpoint of the cutting plate 4. The recesses 44 are symmetrical about the axis 8. Each recess 44 has a planar recess face 46 parallel to the plane 37 beisecting the front faces 24. The recesses 44 are open at one end facing the base 16. Thus, the recess faces 46 each encroach halfway into a respective chamfer 42. Each recess 44 has a pair of axially parallel recess side walls 48. The sidewalls 48 extend from the open end 50 of the recess 44 to a recess end wall 52 located at the opposite end of the recess 44 and arranged perpendicular to the axis 8. The recesses 44 provide a location on each side of the cutting plate 4 to accommodate the opposing jaws 14 when the cutting plate 4 is seated in the groove 12 and clamped to the shank 6. The side walls 48 and end wall 52 of the recesses 44 register precisely with a respective jaw 14 when the cutting plate 4 is seated in the groove 12. This ensure, that the central axis 8 of the cutting plate 4 is concentric with the axis 8 of the shank 6.

Returning to FIG. 1, the groove 12 is deeper than the length of the recess 44 in the cutting plate 4. At a location between the trough 18 of the groove 12 and the base 16 of the cutting plate 4 (when the cutting plate is clamped to the shank) a transverse cylindrical hole 54 passes through both jaws 14 and the axis 8. The hole 54 in one jaw 14 is unthreaded and has a cylindrical recess 56 facing the outside of the shank 6. The hole's recess 56 is sized to accommodate the head 58 of a small bolt 60. The hole 54 of the other jaw 14 is threaded to mesh with the threaded shank of the bolt 60. In the present embodiment the bolt 60 is a cylindrical head bolt with a hexagonal recess 62 to receive a hexagonal key (not shown) to turn the bolt 60 while its head 58 is accommodated by the hole's recess 56. The bolt 60 could be a standard hexagonal head bolt, however the hole's recess 56 would need to be enlarged to facilitate engagement of a socket spanner with the hexagonal head.

The action of turning the bolt 60 to fasten the cutting plate 4 pulls the jaws 14 closer together to clamp the cutting plate 4 in place. Conversely, the action of turning the bolt 60 to loosen the cutting plate 4 allows the jaws 14 to move apart so that the cutting plate 4 can be released from the groove 12 for replacement or repair.

Alternatively, the cutting plate 4 could be brazed, or glued with a strong adhesive, into the groove 12. Accordingly, this would eliminate the transverse hole 54 and bolt 60 arrangement. The cutting plate 4 may even be integral with the shaft 6.

In use, the drill bit 2 rotates in the direction of the circular arrow R. The chisel edge 22 begins the cutting operation by engaging a workpiece W, for example, a ceramic tile. The chisel edge 22 is relatively short and forms a point to initially pierce the hard outer layer of the ceramic tile. Once the chisel edge 22 has pierced the workpiece W, the hole formed therein is steadily enlarged as the primary cutting edges 36 and then the secondary cutting edges 38 cut the workpiece W. The final cutting operation is performed by the side cutting edges 40 which help cut a clean hole in the workpiece W. The side cutting edges 40 also direct the drill bit 2 in a straight line and promote removal of debris away from the tip of the cutting plate 4.

Figure 8:
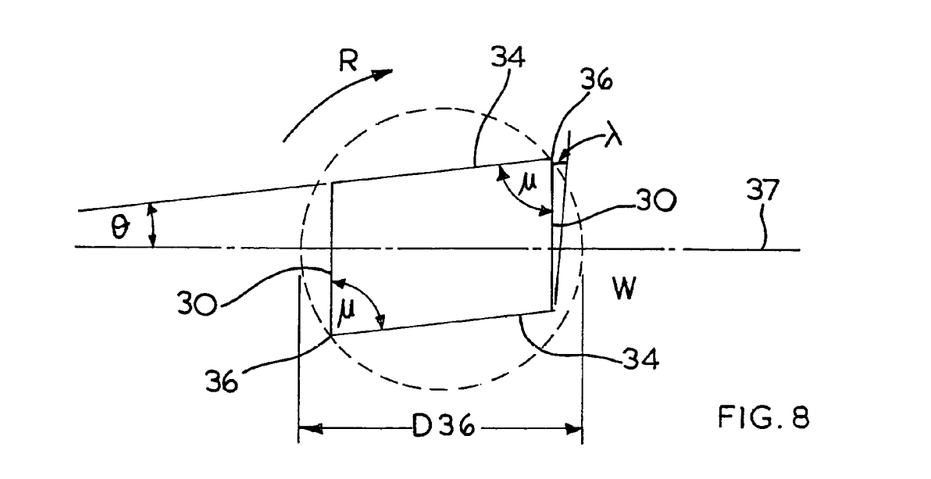
FIG. 8 is a cross-sectional view along the line C—C of FIG. 3.
Figure 9:
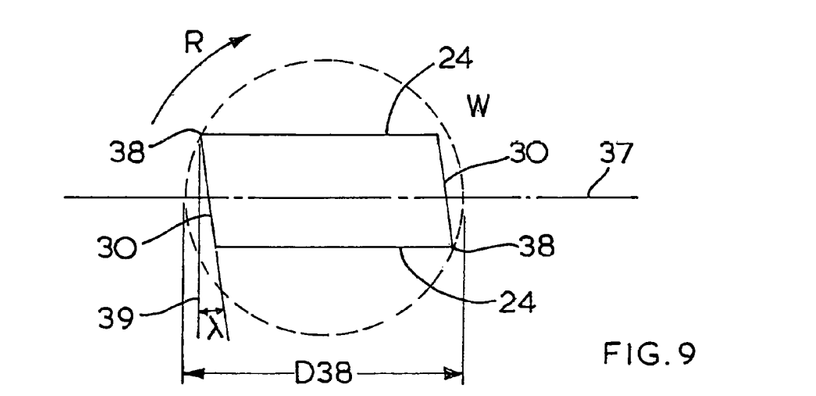
FIG. 9 is a cross-sectional view along the line E—E of FIG. 3.
Figure 10:
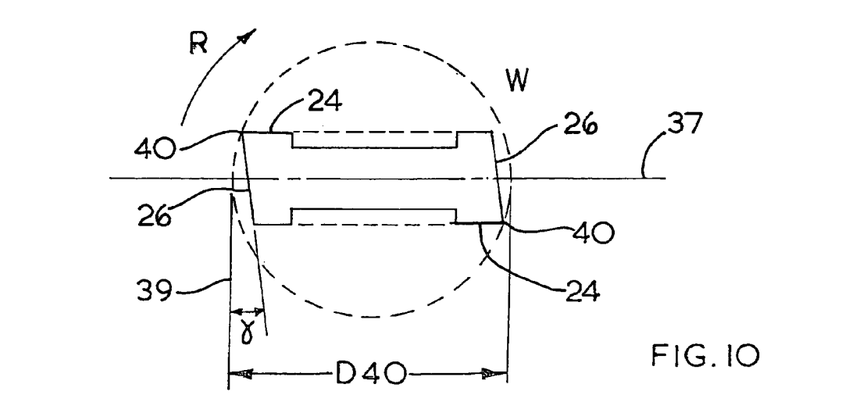
FIG. 10 is a cross-sectional view along the line F—F of FIG. 3.

As is shown in FIGS. 8, 9 and 10, the cutting plate 4 is parallelogram shaped in cross-sections taken at planes normal to the axis 8. The figures show the primary 36, secondary 38 and side 40 cutting edges, respectively. These cutting edges 36, 38, 40 are always located in opposite corners furthest apart. Angle $\lambda$ is fixed by the inclination of the inclined side faces 30 thus angle $\theta$ controls the shape of the parallelogram circumscribed by the inclined side 30 and front 34 faces. If angle $\theta$ is equal to angle $\lambda$ then the parallelogram circumscribed by the inclined side 30 and front 34 faces is rectangular and all its edges become right angled. If angle $\theta$ is greater than the angle $\lambda$, then the primary cutting edge 36 jumps approximately a quarter revolution ahead of the secondary 38 and side 40 cutting edges. This is shown by comparing the position of the primary cutting edge 36 shown in FIG. 8 with that of the secondary and side cutting edges 38, 40 shown in FIGS. 9 and 10. As a result there is a small discontinuity between each primary cutting edge 36 and a respective secondary cutting edge 38.

If the cutting plate 4 is made of tungsten carbide type KCR05 then preferably the primary cutting edge 36 has an included angle $\mu$ of 86°. Primary cutting edges 36, with an included angle $\mu$ of 86°, provide a good compromise between being sharp and hard enough to cut ceramic tiles without being excessively brittle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cutting plate comprising:
a working end for engaging a workpiece;
an axis of rotation;
a pair of oppositely arranged first faces inclined axially rearward from the working end in an axial plane intersecting said first faces, said first faces intersecting to form a chisel edge;
a pair of second faces alternately arranged between the first faces, wherein the second faces are inclined axially rearward from the working end in an axial plane intersecting said second faces; and
a pair of axis parallel front faces, each of the front faces is bound on three sides by a respective first face and said pair of second faces, each second face is inclined radially inward from a transitional edge with a respective rotationally leading first face in a plane normal to the axis intersecting said transitional edge with a respective rotationally leading first face, and each first face is inclined radially inward from a transitional edge with a respective rotationally leading second face in a plane normal to the axis intersecting said transitional edge with a respective rotationally leading second face, as the cutting plate rotates for cutting holes in ceramic material.

2. A cutting plate as claimed in claim 1, wherein an angle ($\beta$) subtended by the first pair of faces forming the chisel edge falls within a range of 90° to 150°.

3. A cutting plate as claimed in claim 2, wherein the angle ($\beta$) subtended by the first pair of faces forming the chisel edge is 100°.

4. A cutting plate as claimed in claim 1, wherein length of the chisel edge is defined by the second pair of faces.

5. A cutting plate as claimed in claim 1, wherein the transitional edge between each first face and a respective rotationally leading second face is a primary cutting edge, and wherein a transitional edge between each second face and a respective rotationally leading front face is a secondary cutting edge.

6. A cutting plate as claimed in claim 1, wherein the cutting plate further comprises a pair of axis parallel side faces each bound on three sides thereof by a respective second face and the pair of front faces.

7. A cutting plate as claimed in claim 6, wherein a side cutting edge is defined at the intersection of each side face with a respective rotationally leading front face, each side face is inclined radially inward from a respective side cutting edge in a plane normal to the axis intersecting said side cutting edge.

8. A cutting plate as claimed in claim 1, wherein the angle ($\alpha$) subtended by the second faces in an axial plane orthogonal to the second faces falls within a range of 30° to 60°.

9. A cutting plate as claimed in claim 8, wherein the angle ($\alpha$) subtended by the second faces in an axial plane orthogonal to the second faces is 43°.

10. A cutting plate as claimed in claim 1, wherein the cutting plate further comprises mechanism for precise attachment of the cutting plate to a shank of a drill bit.

11. A drill bit with a cylindrical shaft comprising a cutting plate as claimed in claim 1.

* * * * *